United States Patent
Raindel et al.

(10) Patent No.: US 10,218,645 B2
(45) Date of Patent: Feb. 26, 2019

(54) LOW-LATENCY PROCESSING IN A NETWORK NODE

(71) Applicant: Mellanox Technologies Ltd., Yokneam (IL)

(72) Inventors: Shachar Raindel, Haifa (IL); Yaniv Saar, Tel Mond (IL); Haggai Eran, Yokneam Ilit (IL); Yishai Israel Hadas, Kiryat-Ata (IL); Ari Zigler, Elkana (IL)

(73) Assignee: Mellanox Technologies, Ltd., Yokneam (IL)

( * ) Notice: Subject to any disclaimer, the term of this patent is extended or adjusted under 35 U.S.C. 154(b) by 587 days.

(21) Appl. No.: 14/247,255

(22) Filed: Apr. 8, 2014

(65) Prior Publication Data

US 2015/0288624 A1    Oct. 8, 2015

(51) Int. Cl.
*G06F 13/38* (2006.01)
*H04L 12/861* (2013.01)

(52) U.S. Cl.
CPC ............ *H04L 49/90* (2013.01); *G06F 13/382* (2013.01); *H04L 49/9047* (2013.01)

(58) Field of Classification Search
CPC .... G06F 13/385; G06F 12/1081; G06F 13/28; G06F 13/102; G06F 13/4221; G06F 1/3203; G06F 2213/0058; G06F 2213/3808; G06F 9/3851; G06F 13/00; G06F 3/06; G06F 3/061; G06Q 40/04; H04L 49/9068; H04L 45/60; H04L 49/109; H04L 49/3063; H04L 49/90
See application file for complete search history.

(56) References Cited

U.S. PATENT DOCUMENTS

| | | | | |
|---|---|---|---|---|
| 7,830,389 | B2 * | 11/2010 | Maass | G06F 3/14 345/503 |
| 8,078,743 | B2 | 12/2011 | Sharp et al. | |
| 2006/0227811 | A1 * | 10/2006 | Hussain | H04L 49/90 370/503 |
| 2007/0113170 | A1 * | 5/2007 | Dignum | G06F 17/2247 715/239 |

(Continued)

FOREIGN PATENT DOCUMENTS

WO    2013136355 A1    9/2013
WO    2013180691 A1    12/2013

OTHER PUBLICATIONS

Hahne et al., "Dynamic Queue Length Thresholds for Multiple Loss Priorities", IEEE/ACM Transactions on Networking, vol. 10, No. 3, pp. 368-380, Jun. 2002.

(Continued)

*Primary Examiner* — Ninos Donabed
(74) *Attorney, Agent, or Firm* — Kligler & Associates

(57) ABSTRACT

A method in a network node that includes a host and an accelerator, includes holding a work queue that stores work elements, a notifications queue that stores notifications of the work elements, and control indices for adding and removing the work elements and the notifications to and from the work queue and the notifications queue, respectively. The notifications queue resides on the accelerator, and at least some of the control indices reside on the host. Messages are exchanged between a network and the network node using the work queue, the notifications queue and the control indices.

13 Claims, 3 Drawing Sheets

(56) References Cited

U.S. PATENT DOCUMENTS

| | | | |
|---|---|---|---|
| 2007/0113171 A1* | 5/2007 | Behrens | G06F 15/7842 715/239 |
| 2007/0113172 A1* | 5/2007 | Behrens | G06F 17/2229 715/239 |
| 2007/0113222 A1* | 5/2007 | Dignum | G06F 17/2705 717/143 |
| 2009/0100280 A1* | 4/2009 | Lindsay | G06F 1/3206 713/321 |
| 2009/0217275 A1* | 8/2009 | Krishnamurthy | G06F 9/5077 718/102 |
| 2011/0161619 A1* | 6/2011 | Kaminski | G06F 9/5016 711/207 |
| 2011/0161620 A1* | 6/2011 | Kaminski | G06F 12/1009 711/207 |
| 2011/0307890 A1* | 12/2011 | Achilles | G06F 9/505 718/100 |
| 2012/0041998 A1* | 2/2012 | Lemoine | H04L 67/06 709/201 |
| 2012/0054770 A1* | 3/2012 | Krishnamurthy | G06F 9/4893 718/105 |
| 2012/0054771 A1* | 3/2012 | Krishnamurthy | G06F 9/4881 718/105 |
| 2012/0254587 A1* | 10/2012 | Biran | G06F 9/3877 712/34 |
| 2013/0014118 A1 | 1/2013 | Jones | |
| 2013/0145375 A1* | 6/2013 | Kang | G06F 21/53 718/104 |
| 2013/0262902 A1* | 10/2013 | Herdrich | G06F 9/5094 713/323 |
| 2013/0275631 A1 | 10/2013 | Magro et al. | |
| 2013/0305250 A1 | 11/2013 | Durant | |
| 2014/0337855 A1* | 11/2014 | Bass | G06F 9/5044 718/107 |
| 2014/0359636 A1* | 12/2014 | Xu | G06F 9/4856 718/108 |
| 2014/0380319 A1* | 12/2014 | Haverkamp | G06F 9/4881 718/102 |
| 2015/0268985 A1* | 9/2015 | Jokinen | G06F 9/50 718/102 |

OTHER PUBLICATIONS

Choudhury et al., "Dynamic Queue Length Thresholds for Shared-Memory Packet Switches", IEEE/ACM Transactions Networking, vol. 6, Issue 2, pp. 130-140, Apr. 1998.

Infiniband TM Architecture, Specification vol. 1, Release 1.2.1, Chapter 12, pp. 657-716, Nov. 2007.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

* cited by examiner

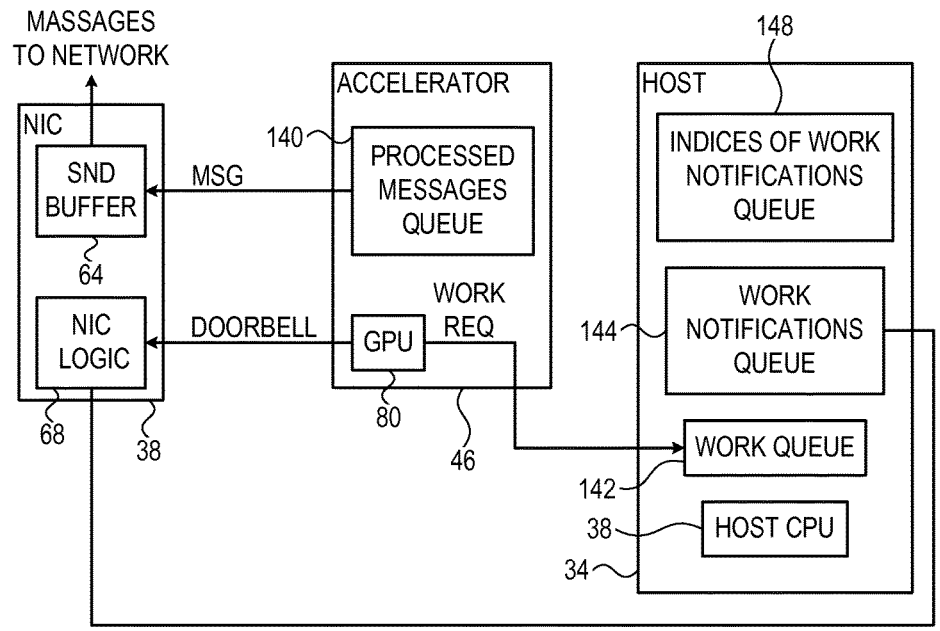
FIG. 4
FIG. 5
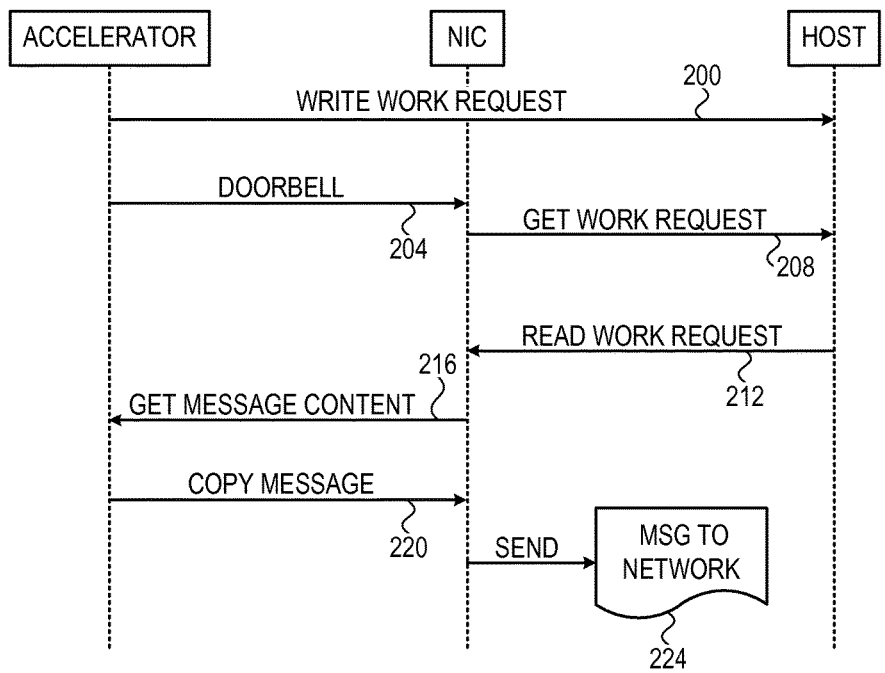

LOW-LATENCY PROCESSING IN A NETWORK NODE

FIELD OF THE INVENTION

The present invention relates generally to network communications, and particularly to methods and systems for achieving low latency processing of data received in a network node.

BACKGROUND OF THE INVENTION

In some communication networks, a network node processes data received over the network using a local accelerator. Various methods for delivering data to the accelerator are known in the art. For example, PCT International Publication WO 2013/180691, whose disclosure is incorporated herein by reference, describes devices coupled via one or more interconnects. In one embodiment, a Network Interface Card (NIC), such as a Remote Direct Memory Access (RDMA) capable NIC, transfers data directly into or out of the memory of a peer device that is coupled to the NIC via one or more interconnects, bypassing a host computing and processing unit, a main system memory or both.

PCT International Publication WO 2013/136355, whose disclosure is incorporated herein by reference, describes a network node that performs parallel calculations on a multi-core GPU. The node comprises a host and a host memory on which a calculation application can be installed, a GPU with a GPU memory, a bus and a Network Interface Card (NIC). The NIC comprises means for receiving data from the GPU memory and metadata from the host over the bus, and for routing the data and metadata towards the network. The NIC further comprises means for receiving data from the network and for providing the data to the GPU memory over the bus. The NIC thus realizes a direct data path between the GPU memory and the network, without passing the data through the host memory.

SUMMARY OF THE INVENTION

An embodiment of the present invention provides a method in a network node that includes a host and an accelerator. The method includes holding a work queue that stores work elements, a notifications queue that stores notifications of the work elements, and control indices for adding and removing the work elements and the notifications to and from the work queue and the notifications queue, respectively. The notifications queue resides on the accelerator, and at least some of the control indices reside on the host. Messages are exchanged between a network and the network node using the work queue, the notifications queue and the control indices.

In some embodiments, exchanging the messages includes receiving the messages for processing by the accelerator, and the work elements include the received messages. In other embodiments, receiving the messages includes receiving a new notification indicating a new received message, and adding the new notification to the notifications queue. In yet other embodiments, receiving the message includes detecting the new notification by polling the notifications queue. In yet further other embodiment, receiving the message includes storing the message in a receiver buffer of a network adapter of the network node, and copying the message directly from the receiver buffer to the accelerator.

In an embodiment, exchanging the messages includes updating the control indices by changing the control indices to reflect the addition or removal of a new notification to or from the notifications queue. In another embodiment, the accelerator includes a storage system, and exchanging the messages includes exchanging data for storage in the storage system. In yet another embodiment, the accelerator includes a network interface, and exchanging the messages includes exchanging data traffic between the network and one or more other networks.

In some embodiments, exchanging the messages includes sending the messages from the accelerator to the network, and the work elements include work requests that indicate the messages to be sent. In other embodiments, sending the messages includes writing a work request indicating a message ready for sending, and sending to a network adapter of the network node a doorbell message indicating the work request. In yet other embodiments, sending the messages includes writing a send completion notification in the notifications queue when the network adapter completes sending the message. In yet further other embodiments, sending the message includes delivering the message, upon receiving the doorbell message, directly from the accelerator to the network adapter.

There is additionally provided, in accordance with an embodiment of the present invention, a network node including a work queue, which is configured to store work elements, an accelerator, which is configured to hold a notifications queue that stores notifications of the work elements, a host, which is configured to hold at least some of control indices for adding and removing the work elements and the notifications to and from the work queue and the notifications queue, respectively, and a network adapter, which is configured to exchange messages between a network and the network node using the work queue, the notifications queue and the control indices.

There is additionally provided, in accordance with an embodiment of the present invention a method, in a network node that includes a host, an accelerator, a work queue that stores work elements of messages to be sent, and a notifications queue that stores notifications of the work elements. The messages to be sent reside on the accelerator, the work queue resides on the host, and the accelerator sends the work elements directly to the work queue using direct memory accessing (DMA). The messages are sent from the network node to the network using the work queue and the notifications queue.

There is additionally provided, in accordance with an embodiment of the present invention, a network node including a host, a network adapter and an accelerator. The accelerator is configured to store messages to be sent to the network, and the host is configured to hold a work queue that stores work elements of the messages to be sent. The work elements are sent from the accelerator to the work queue using Direct Memory Access (DMA). The host is further configured to hold a notifications queue that stores notifications of the work elements. The network adapter is configured to send the messages from the network node to the network using the work queue, and the notifications queue.

The present invention will be more fully understood from the following detailed description of the embodiments thereof, taken together with the drawings in which:

BRIEF DESCRIPTION OF THE DRAWINGS

FIG. 4 is a block diagram that schematically illustrates data and control paths in a node sending processed data, in accordance with another embodiment of the present invention; and FIG. 5 is a diagram that schematically illustrates a sequence of interactions among the elements of a node that sends a message of processes data, in accordance with another embodiment of the present invention.

DETAILED DESCRIPTION OF EMBODIMENTS

Overview

Figure 1:
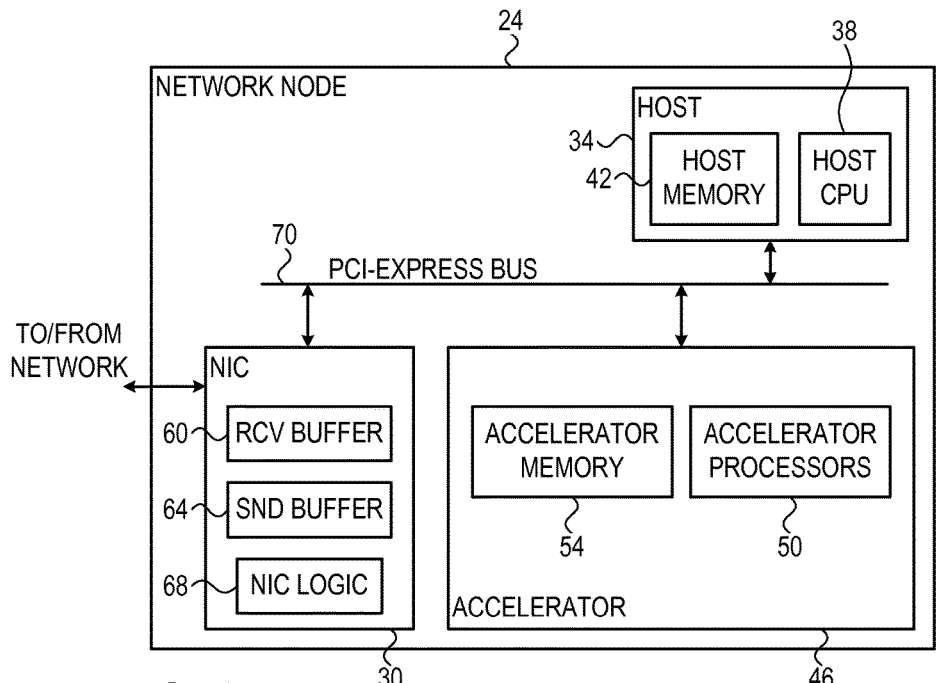
FIG. 1 is a block diagram that schematically illustrates a network node, in accordance with an embodiment of the present invention.

A network node may receive data to be processed in a local accelerator from other nodes or devices in the network. The node may additionally send results of accelerated processing tasks to the network.

Embodiments of the present invention that are described herein provide improved methods and systems for data processing in nodes that employ accelerators. The disclosed techniques achieve low processing and sending delays. The terms "processing latency" or "processing delay" refer to the duration between message arrival and the processing start time. The duration between processing conclusion and the time of sending the results to the network is referred to herein as "sending latency" or "sending delay." The disclosed techniques reduce both the processing and the sending delays.

In the disclosed embodiments, a network node comprises a host, an accelerator and a network adapter such as a NIC, which communicate with one another over an internal bus. In an example embodiment, the accelerator comprises a Graphics Processing Unit (GPU) and the internal bus comprises a Peripheral Component Interconnect Express (PCI-E) bus. In alternative embodiments, the node may comprise any other suitable network adapter, such as, for example, a Host Channel Adapter (HCA) in Infiniband networks.

In some embodiments, the accelerator holds a queue of completion notifications, wherein each completion notification entry corresponds to a respective received message. Alternatively, a single completion notification may correspond to multiple received messages. The control indices for inputting and outputting notification entries into and out of the queue, however, are stored in the host memory and are managed by the host.

In an embodiment, when a message arrives, the NIC checks if there are available resources to handle the message by querying the control indices in the host memory. If the message can be handled, the NIC saves the message directly in the accelerator memory, and adds a respective notification entry to the completion notifications queue. In some embodiments, the NIC adds a notification after receiving multiple messages. The accelerator polls the notifications queue, and upon detecting a new entry starts to process the respective received data. The accelerator additionally updates the respective control indices of the queue in the host memory.

Since this flow does not involve the host, and since the accelerator does not have to wait for the update of the control indices in the host memory before starting the processing, the flow achieves minimal processing latency. Moreover, since reading from the host memory over the PCI-E bus is much faster than peer-to-peer PCI-E reading from the accelerator, managing the control indices on the host memory enables the NIC to query these indices with minimal latency.

In a variant of the previous embodiment, both the host and the accelerator hold a copy of the control indices of the notifications queue. In this embodiment, the accelerator manages the control indices locally, and the host occasionally updates the shadow copy of the indices in the host memory.

In another embodiment, when the accelerator completes the processing of a given message, the accelerator writes a respective work request in a work queue in the host memory, and sends a doorbell message to the NIC. In some embodiments, the accelerator sends the doorbell after writing multiple work requests. The work queue stores requests to send messages to the network. In response to receiving the doorbell message, the NIC gets or retrieves the corresponding work request from the host and initiates a direct copy of the message from the accelerator memory to the sending buffer of the NIC. The NIC then sends the message to the network. In a variant of this embodiment, the accelerator writes the content of the message to be sent in the host memory, and additionally writes a work request for the NIC, to copy the message from the host memory to the sending buffer of the NIC.

This flow achieves minimal sending latency, since the flow does not involve storing the message in the host memory, and since the NIC receives the doorbell directly from the accelerator without involving the host. Additionally, since the work queue is stored on the host memory, the NIC can retrieve work requests using fast PCI-E read operations. In some embodiments, the latency can be reduced even further, by including the message to be sent to the network, or significant parts of the message, within the doorbell message that the accelerator sends to the NIC.

In the disclosed techniques, the structures and the management of the queue of the received messages may be divided between the accelerator and the host in various ways. In some embodiments, the accelerator manages the notifications queue part, which requires only small computational resources, whereas the host manages the control indices of the queue, a task that is typically not performed well by accelerators. Since in addition, the NIC has a direct link to the accelerator memory for incoming and outgoing messages, and the data and control paths include no, or only little, involvement of the host, this architecture achieves minimal processing and sending latencies. In addition, the disclosed techniques require only a small number of transactions over the PCI-E bus, and refrain from unnecessary slow peer-to-peer PCI-E transactions. This also contributes to lower the latencies.

System Description

FIG. 1 is a block diagram that schematically illustrates a network node 24, in accordance with an embodiment of the present invention. Node 24 can be part of any suitable communication network and related protocols. For example, the network may comprise a local or a wide area network (WAN/LAN), a wireless network or a combination of such networks, based for example on the geographic locations of the nodes. Additionally, the network may be a PCI-E bus, or packet network such as Network On Chip (NOC), IP, Infiniband or Ethernet network delivering information at any suitable data rate.

Network node 24 comprises a Network Interface Card (NIC) 30 for communicating with other nodes or devices in the network, and a host 34 that carries out the various tasks of the node. Host 34 comprises a Central Processing Unit (CPU) 38, and a host memory 42 for storing code and data. Node 24 further comprises a processing accelerator 46 that can process data sent, for example, from some remote node or device. Typically, accelerator 46 comprises one or more processors 50 and an accelerator memory 54.

In some embodiments, accelerator 46 comprises a Graphics Processing Unit (GPU), and processors 50 comprise multiple GPU cores that are typically designed for parallel rather than linear processing. In alternative embodiments, however, any other accelerator can also be used, such as, for example, a Field Programmable Gate Array (FPGA), an Application-Specific Integrated Circuit, a ciphering accelerator, or an accelerator suitable for a storage system implementing a Redundant Array of Independent Disks (RAID). The accelerator and the host may reside in a common package or implemented on separate packages.

Node 24 receives data from and sends data to the network using NIC 30. NIC 30 stores data received from the network in a receiver buffer 60, and data to be sent to the network in a sender buffer 64. NIC logic 68 manages the various tasks of NIC 30.

Host 34, accelerator 46 and NIC 30 communicate with one another via a high speed bus or crossbar 70. In some embodiments, bus 70 comprises a Peripheral Component Interconnect Express (PCI-E) bus. In alternative embodiments, bus 70 may comprise any suitable bus, such as, for example, Intel's Quick Path Interconnect (QPI) bus, or AMD's Hyper Transport (HT) bus. In some embodiments, host 34 comprises a PCI-E switch (not shown), to which the accelerator and the NIC connect using bus 70. The NIC, the accelerator and the host may connect to separate buses of different technologies, and interconnect via dedicated interfaces.

Bus 70 enables NIC 30 to directly access host memory 42 and accelerator memory 54. In some embodiments, the host and/or accelerator memories are not fully accessible, and the NIC has access to only parts of memories 42 and/or 52. A bus architecture feature that enables a device connected to the bus to initiate transactions is also referred to as "bus mastering" or Direct Memory Access (DMA). The access time between processors 50 and memory 54 within the accelerator is typically faster than communication transactions made over bus 70.

The configuration of network node 24 in FIG. 1 is an example configuration, which is chosen purely for the sake of conceptual clarity. In alternative embodiments, any other suitable node configuration can also be used. The different elements of node 24, such as NIC 30 and accelerator 46, may be implemented using any suitable hardware, such as in an Application-Specific Integrated Circuit (ASIC) or Field-Programmable Gate Array (FPGA). In some embodiments, some elements of node 24 can be implemented using software, or using a combination of hardware and software elements.

In some embodiments, certain node elements, such as host CPU 38, may comprise a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Processing Received Messages with Minimal Latency

Figure 2:
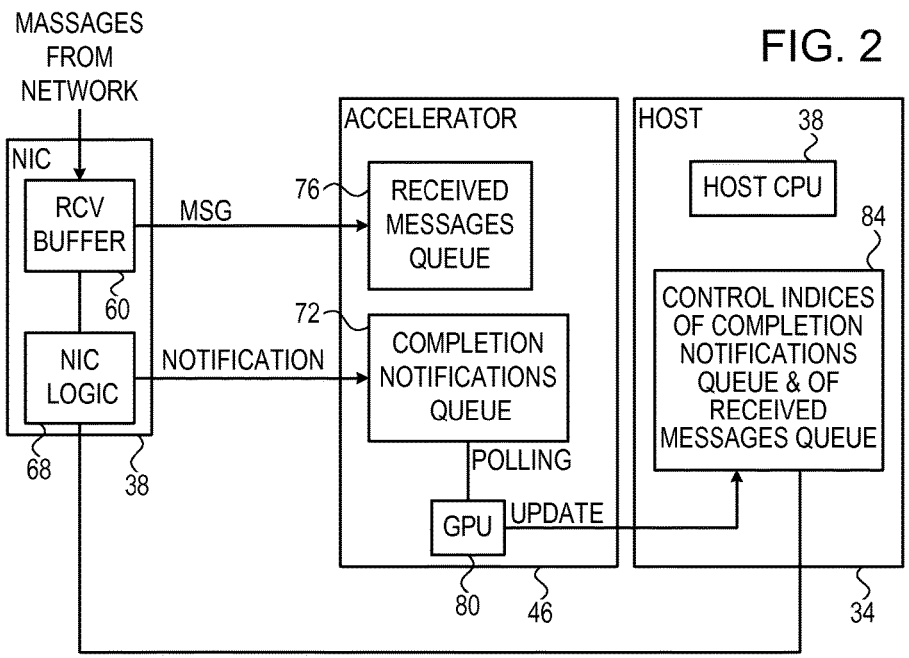
FIG. 2 is a block diagram that schematically illustrates data and control paths in a node that processes received data using an accelerator, in accordance with an embodiment of the present invention.

FIG. 2 is a block diagram that schematically illustrates the data and control paths in node 24 that processes received data using an accelerator, in accordance with an embodiment of the present invention. In the architecture presented in FIG. 2, the management and the data structures that handle queuing received messages are divided between host 34 and accelerator 46.

The accelerator handles a completion notifications queue 72, wherein each queue entry comprises a notification of a respective received message. In some embodiments, a notification in queue 72 may correspond to multiple messages in received messages queue 76. Host 34, on the other hand, manages control indices 84 of the notifications queue, for adding new entries and removing already served entries. As will be explained below, such a partitioning of the queue management functions enables to reduce the processing latency, and incurs only little queue management effort on the accelerator.

NIC 30 receives messages from the network and stores these messages in receiver buffer 60. The messages may comprise any suitable structure, such as, for example, one or more data packets. NIC logic 68 analyses the received messages, copies the messages from receiver buffer 60 to a received messages queue 76 in accelerator memory 54, and writes a respective completion notification in completion notifications queue 72 in accelerator memory 54. When the NIC receives the message using Remote Direct Memory Access (RDMA), the message typically includes the destination of the message (e.g., in the accelerator memory). In alternative embodiments, instead of the NIC, the accelerator can perform the message copy (e.g., upon receiving the respective completion notification) from the receiver buffer of the NIC or from a temporary buffer in the host memory to which the NIC stored the message.

In the present example, accelerator 46 comprises a Graphics Processing Unit (GPU) 80 that detects the arrival of new messages, for example, by polling completion notifications queue 72. In this embodiment, accelerator processors 50 of FIG. 1 above comprise GPU cores of GPU 80. GPU 80 can start the processing immediately as the received message is fully copied to the accelerator memory (i.e., without waiting for any other indication).

Host 34 stores and manages control indices 84 of completion notifications queue 72 and of received messages queue 76. When GPU 80 removes completion notifications from completion notifications queue 72, the GPU sends respective indications to host 34 to update control indices 84 accordingly (or directly reads or updates the indices from the host memory). In some embodiments, both the host and the accelerator hold a copy of indices 84. The accelerator manages the control indices locally, and the host occasionally (e.g., periodically) updates its shadow copy of the indices.

Figure 3:
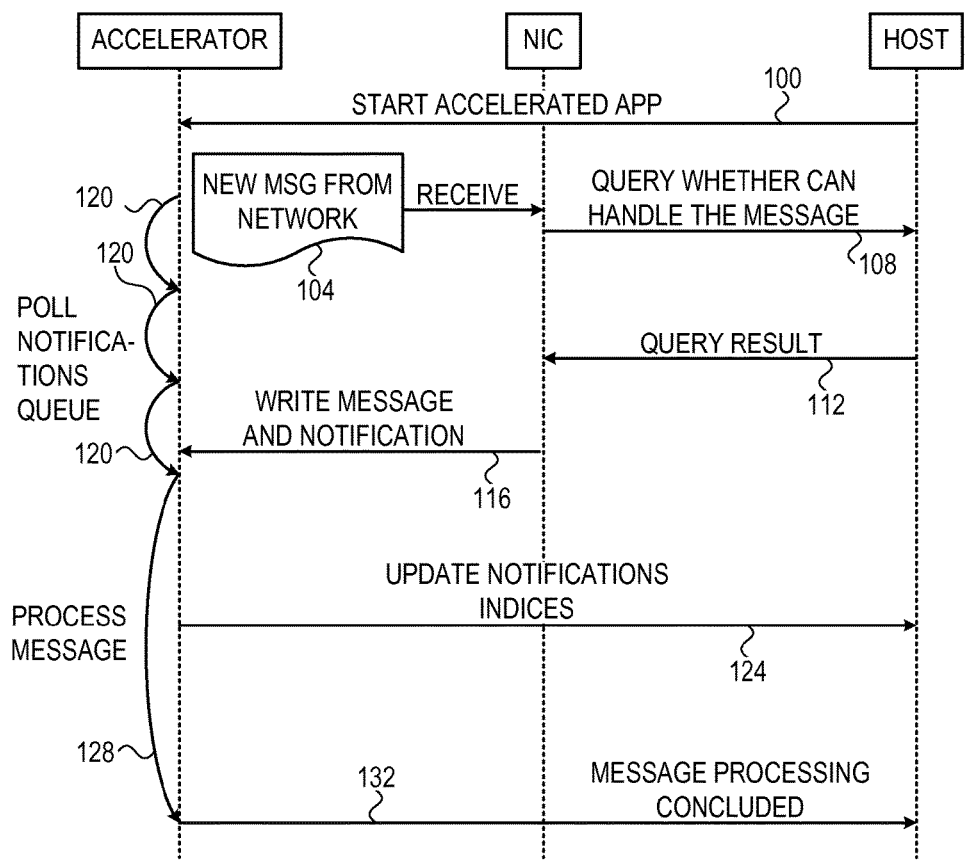
FIG. 3 is a diagram that schematically illustrates a sequence of interactions among elements of a node that processes received data using an accelerator, in accordance with an embodiment of the present invention.

FIG. 3 is a diagram that schematically illustrates the sequence of interactions among elements of node 24 that processes received data using an accelerator, in accordance with an embodiment of the present invention. The sequence begins with host 34 sending an application start command 100 to accelerator 46, which in response starts the execution of the respective acceleration application.

When NIC 30 receives a new message 104 from the network, the NIC stores the message in receiver buffer 60, and sends a query message 108 to the host, to check whether node 24 can handle the message. In an embodiment, the NIC queries the status of indices 84 to discover whether the message can be handled. Sending query message 108 and receiving back corresponding query result 112 can be done using Direct Memory Access (DMA), without involving the host. For example, the NIC may directly read the status of indices 84 from the host memory. If notification 112 indicates that the node has sufficient resources to handle the message, the NIC copies the message from receiver buffer 60 directly to received messages queue 76 in accelerator memory 54, and writes a respective notification entry in completion notifications queue 72. These last two operations are indicated by an arrow 116 in the figure.

In some embodiments, messages queue 76 is implemented as a queue of message descriptors that include pointers to memory locations in which the messages are stored. In such embodiments, the NIC copies the received message to some available memory location and updates the memory location in the respective message descriptor. In some embodiments, the message descriptors queue resides in the host memory.

Arrows 120 depict GPU 80 polling completion notifications queue 72, to detect the arrival of new messages. Upon detecting a new message, the GPU starts to process the message as depicted by arrow 128. Additionally, the GPU sends an updating message 124 to the host to update control indices 84 (e.g., updating the indices using DMA). In some embodiments, the accelerator initiates the message processing and the update of the indices in parallel. Alternatively, the accelerator first initiates the update of the indices (which incurs only little latency), and then starts to process the message. When GPU 80 finishes the processing, the GPU may send a conclusion message 132 to the host, which updates control indices 84 accordingly.

In the method of FIG. 3, the accelerator achieves low processing latency by starting to process a received massage independently of updating the control indices of the completion notifications queue by the host. In addition, to check whether the node can handle a received message, the NIC queries the status of the control indices in the host memory using DMA, and without involving the host.

Sending Messages with Minimal Latency

FIG. 4 is a block diagram that schematically illustrates the data and control paths in node 24 sending processed data, in accordance with an embodiment of the present invention. In the present example, accelerator 46 stores messages to be sent in a send message queue 140. The messages in queue 140 are to be sent to the network by NIC 30.

Host 34 stores a work queue 142 of work request entries in host memory 42. When a message is ready in send messages queue 140, GPU 80 sends a respective work request to host 34 (e.g., using DMA). The host additionally manages work queue 142 using a work notifications queue 144, and control indices 148 of the work queue. GPU 80 can initiate the actual sending of a message by sending a respective notification, also referred to as a doorbell message, to NIC logic 68. In some embodiments, the doorbell message may refer to multiple work requests.

When NIC 68 concludes sending a given message, the NIC writes a respective notification in work notifications queue 144 in the host memory. The host polls work notifications queue 144, and upon detecting a new notification, the host updates respective indices queue 148 accordingly. In another embodiment, the accelerator is responsible for polling the notifications queue, and for sending an asynchronous request to update the respective indices, accordingly.

In some embodiments, work notifications queue 144 resides in the accelerator and not in the host. Although in FIGS. 2 and 4 received messages, and messages to be sent, are managed in separate respective queues 76 and 144, in alternative embodiments, a common queue serves for both directions. In such embodiments, the pairs of notification queues 72 and 144, and control indices 84 and 148, may be also each combined to a common queue.

FIG. 5 is a diagram that schematically illustrates the sequence of interactions among the elements of node 24 that sends a message of processed data, in accordance with an embodiment of the present invention. The sequence begins with GPU 80 writing a work request 200 in work queue 142. Work request 200 notifies of a given message in queue 140 that is ready to be sent.

In addition to sending the work request, GPU 80 sends a doorbell message 204 to NIC logic 68. In response to receiving the doorbell message, NIC logic 68 sends a get work request message 208 to the host, to retrieve the respective work request. The NIC receives respective work request 212, and then sends a get message request 216 to accelerator 46. In some embodiments, the NIC retrieves the work request (arrows 208 and 212) using DMA without involving the host. In response to receiving message 216, GPU 80 copies the respective message 220 from queue 140 to sender buffer 64 in the NIC. In an embodiment, copying the message is done using DMA without involving the GPU. NIC logic 68 then delivers the message to the network (indicated by message sending 224).

In some embodiments, doorbell message 204 above, contains the content of the message to be sent. In such embodiments, the operations described by arrows 208, 212, 216 and/or 220, or part thereof may be excluded.

The various node configurations described above are exemplary, and any other suitable node configuration can also be used. For example, in FIGS. 2 and 3 above, the GPU can detect the arrival of new messages using interrupt methods rather than polling. As another example, sequences other than those presented in FIGS. 3 and 5 above, in which the host is involved only in control management, and without actually storing incoming and outgoing messages in the host memory can also be used.

In some embodiments, accelerator 46 comprises dedicated acceleration hardware that when notified, processes the received message, without storing it locally. In these embodiments, the received messages are typically not queued, and therefore the elements: messages queue 72, completion notifications queue 76 and/or indices 84 (or part of these elements), can be excluded.

In the disclosed techniques, the control indices reside in the host memory. In alternative embodiments, however, at least part of the control indices can reside on the accelerator memory. Although in FIG. 4 both the work queue and the work notifications queue reside on the host memory, in alternative embodiments, one of these queues can reside on the host memory and the other queue on the accelerator memory. Further alternative or additionally, the work queue can reside on the NIC.

Although the embodiments described herein mainly address low latency acceleration in a network node, the methods and systems described herein can also be used in other applications, such as in network nodes whose accelerator is designed to perform a specific acceleration task using, for example, FPGA and/or ASIC implementations. Alternatively, the disclosed techniques can be used in storage systems, or in secondary storage systems, in which storage elements replace the accelerator. The disclosed techniques can also be used with the accelerator being a network interface, and the functionality provided is to bridge between the network to which the node connects and various other networks.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network node, comprising:
 a host processor and a host memory coupled to the host processor;
 an acceleration processor and an accelerator memory coupled to the acceleration processor; and
 a network adapter network interface controller (NIC), which is configured to connect the network node to a network, to receive from the network inbound messages for processing by the accelerator, and responsively to one or more received inbound messages to query a control index, over a PCI-E bus, to determine whether the accelerator memory has sufficient resources to handle the one or more inbound messages, to store a notification of the received one or more inbound messages in an inbound notifications queue in the accelerator memory if determined that there are sufficient resources, and to update the control index of the inbound notifications queue to indicate the storing of the notification in the inbound notifications queue, wherein the control index is stored in the host memory,
 wherein the acceleration processor is configured to read the stored notification in the accelerator memory, to handle the one or more inbound messages responsively to the read notification and to update the control index of the inbound notifications queue to indicate removal of the notification from the inbound notifications queue.

2. The network node according to claim 1, wherein the acceleration processor is configured to detect the stored notification by polling the inbound notifications queue.

3. The network node according to claim 1, wherein the network adapter is configured to store the received one or more inbound messages in a receiver buffer of the network adapter, and to copy the received one or more inbound messages directly from the receiver buffer to the accelerator memory.

4. The network node according to claim 1, wherein the acceleration processor is part of a storage system, and wherein the network adapter is configured to exchange data for storage in the storage system.

5. The network node according to claim 1, wherein the acceleration processor is part of a network interface, and wherein the network adapter is configured to receive the inbound messages and to transmit outbound messages by exchanging data traffic between the network and one or more other networks.

6. A method, comprising:
 in a network node, which is connected to a network and which comprises a host and a corresponding host memory and an accelerator that is separate from the host, which has a corresponding accelerator memory:
 receiving, by a network interface controller (NIC) from the network, one or more inbound messages for processing by the accelerator;
 storing a notification of the received one or more inbound messages, by the NIC, in an inbound notifications queue in the accelerator memory;
 updating a control index of the inbound notifications queue to indicate the storing of the notification in the inbound notifications queue, wherein the control index is stored in the host memory;
 reading the stored notification in the accelerator memory, by the accelerator;
 handling the one or more inbound messages by the accelerator responsively to the read notification; and
 updating the control index of the inbound notifications queue to indicate removal of the notification from the inbound notifications queue,
 wherein the method further comprises querying the control index in the host memory, responsive to receiving the one or more inbound messages by the NIC, to determine whether the accelerator memory has sufficient resources to handle the one or more inbound messages, and storing the notification of the received one or more inbound messages if determined that there are sufficient resources,
 wherein querying the control index in the host memory comprises querying by the NIC over a PCI-E bus.

7. The method according to claim 6, comprising detecting the stored notification by the accelerator, by polling the inbound notifications queue, and wherein reading the stored notification is performed responsive to the detection of the new inbound notification.

8. The method according to claim 6, wherein receiving the one or more inbound messages comprises storing the received one or more inbound messages in a receiver buffer of the NIC, and further comprising copying the received one or more inbound messages directly from the receiver buffer to the accelerator memory.

9. The method according to claim 8, wherein copying the received one or more inbound messages directly from the receiver buffer is performed by the NIC.

10. The method according to claim 8, wherein copying the received one or more inbound messages directly from the receiver buffer is performed by the accelerator.

11. The method according to claim 6, wherein handling the one or more inbound messages by the accelerator is started before the updating of the control index.

12. The method according to claim 6, comprising holding an additional copy of the control index of the inbound notifications queue in the accelerator memory.

13. The method according to claim 12, wherein the accelerator changes the copy of the control index in the accelerator memory, and the host occasionally updates its copy of the control index from the accelerator copy of the control index.

* * * * *